US006671733B1

(12) United States Patent
Errickson et al.

(10) Patent No.: US 6,671,733 B1
(45) Date of Patent: Dec. 30, 2003

(54) INTERNAL PARALLEL SYSTEM CHANNEL

(75) Inventors: Richard K. Errickson, Poughkeepsie, NY (US); Ambrose A. Verdibello, Jr., Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/534,679

(22) Filed: Mar. 24, 2000

(51) Int. Cl.[7] .............................................. G06F 17/50
(52) U.S. Cl. ..................... 709/232; 709/238; 707/10; 707/104.1
(58) Field of Search ............... 710/5, 100; 709/249, 709/220, 222, 310, 200, 202, 221, 227, 230, 232, 238, 250; 379/93.29; 707/1, 10, 104.1

(56) References Cited

U.S. PATENT DOCUMENTS

| | | | | |
|---|---|---|---|---|
| 4,360,196 A | * | 11/1982 | Weisbach | 271/235 |
| 4,430,699 A | * | 2/1984 | Segarra et al. | 709/230 |
| 5,388,266 A | * | 2/1995 | Frey et al. | 711/163 |
| 5,414,851 A | | 5/1995 | Brice, Jr. et al. | 395/650 |
| 5,485,579 A | * | 1/1996 | Hitz et al. | 709/221 |
| 5,568,638 A | * | 10/1996 | Hayashi et al. | 707/1 |
| 5,574,945 A | * | 11/1996 | Elko et al. | 710/5 |
| 5,659,786 A | * | 8/1997 | George et al. | 713/100 |
| 5,664,219 A | * | 9/1997 | Glassen et al. | 710/5 |
| 5,671,441 A | * | 9/1997 | Glassen et al. | 710/8 |
| 5,835,710 A | * | 11/1998 | Nagami et al. | 709/250 |
| 5,854,903 A | | 12/1998 | Morrison et al. | 395/200.79 |
| 5,887,184 A | | 3/1999 | Ramanan et al. | 395/800.13 |
| 5,907,684 A | * | 5/1999 | Halma et al. | 709/237 |
| 5,943,150 A | | 8/1999 | Deri et al. | 359/133 |
| 6,065,037 A | * | 5/2000 | Hitz et al. | 709/200 |
| 6,202,070 B1 | * | 3/2001 | Nguyen et al. | 707/104.1 |
| 6,343,322 B2 | * | 1/2002 | Nagami et al. | 709/227 |
| 6,427,173 B1 | * | 7/2002 | Boucher et al. | 709/238 |

FOREIGN PATENT DOCUMENTS

JP 01105463 11/1990 ........... H04L/12/56

* cited by examiner

Primary Examiner—Hosain T. Alam
Assistant Examiner—Shabana Qureshi
(74) Attorney, Agent, or Firm—Floyd A. Gonzalez; Lily Neff

(57) ABSTRACT

A method and apparatus that provide connectivity in a computer network environment that includes a plurality of nodes, interface links and at least one central electronic complex divided into one or more physical and or virtual sub-environments. A first control program is provided in the central electronic complex in order to establish a first command process layer and a first transfer process layer within this first control program for handling data. The first command process layer is then linked to the first transfer process layer in this control program. A second control program is also provided in the central electronic complex in order to establish a second command process layer and a second transfer process layer within this second control program for handling data. The second command process layer is also linked to the second transfer layer in said second control program. Ultimately a link is emulated between the first transfer process layer and the second transfer process layer; and a physical interface is provided between the first transfer process layer and the second transfer process layer without affecting any of the logical interface(s) between the transfer process layers.

36 Claims, 4 Drawing Sheets

INTERNAL PARALLEL SYSTEM CHANNEL

FIELD OF INVENTION

An apparatus and method for providing connectivity using physical and emulated links so as to allow for simultaneous connection of such nodes particularly in a parallel sysplex environment.

BACKGROUND OF THE INVENTION

Networks provide the means of exchanging information, whether it is data, voice or other medium. Most networks provide for a plurality of switching nodes connected to each other, and to other communication devices by links. Each link is further characterized by a bandwidth or link capacity. When information is to be exchanged between two communication devices, a path is established within the network connecting the origination nodes to destination nodes and their respective associated devices. In many networks, the specified origin and destination nodes are connected through physical paths. In other instances, wherein each path is characterized by a predetermined bandwidth, the origin-to-destination paths are referred to as "logical" or "virtual" paths. It is possible that several such virtual paths may co-exist along all or some part of a physical path within a network. An important element of logical network design is the process of selecting a set of physical paths through the network having sufficient capacity for carrying the estimated traffic of a communications system. This process may take into account various factors such as network topology and available network resources.

It should also be noted that logical paths and the grouping of such logical paths into one or more logical sub-networks can characterize both or a network having a set of logical sub-networks for serving various users, and often such sub-networks are re-dimensioned from time to time to serve changing traffic requirements.

In a parallel sysplex environment, transfer of commands, responses and data-necessitates the use of high bandwidth fiber-optic links. Furthermore, shared database software in the sysplex requires the use of transceivers for interchange of command and data between an operating system database and a control program, such as Coupling Facility. The control program resides within a logical partition on a CEC which may or may not be dedicated to it. In instances where the CEC is not dedicated, other logical partitions on that CEC may exist as operating system database nodes in the sysplex.

In current sysplex implementations, a database node which resides in the same CEC must use fiber-optic links and transceivers to establish connectivity. Nonetheless, the existing art does not provide for instances where virtual connections and physical connections, can co-exist between origin to destination nodes primarily when the operating system and the control program co-exist within the same CEC. The present invention provides connectivity using physical and emulated links so as to allow for simultaneous connection of such nodes.

SUMMARY OF THE INVENTION

The method and apparatus described by the present invention provide connectivity in a computer network environment that includes a plurality of nodes, interface links and at least one central electronic complex divided into one or more physical and or virtual sub-environments. A first control program is provided in the central electronic complex in order to establish a first command process layer and a first transfer process layer within this first control program for handling data. The first command process layer is then linked to the first transfer process layer in this control program. A second control program is also provided in the central electronic complex in order to establish a second command process layer and a second transfer process layer within this second control program for handling data. The second command process layer is also linked to the second transfer layer in said second control program. Ultimately a link is emulated between the first transfer process layer and the second transfer process layer; and a physical interface is provided between the first transfer process layer and the second transfer process layer without affecting any of the logical interface(s) between the transfer process layers.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
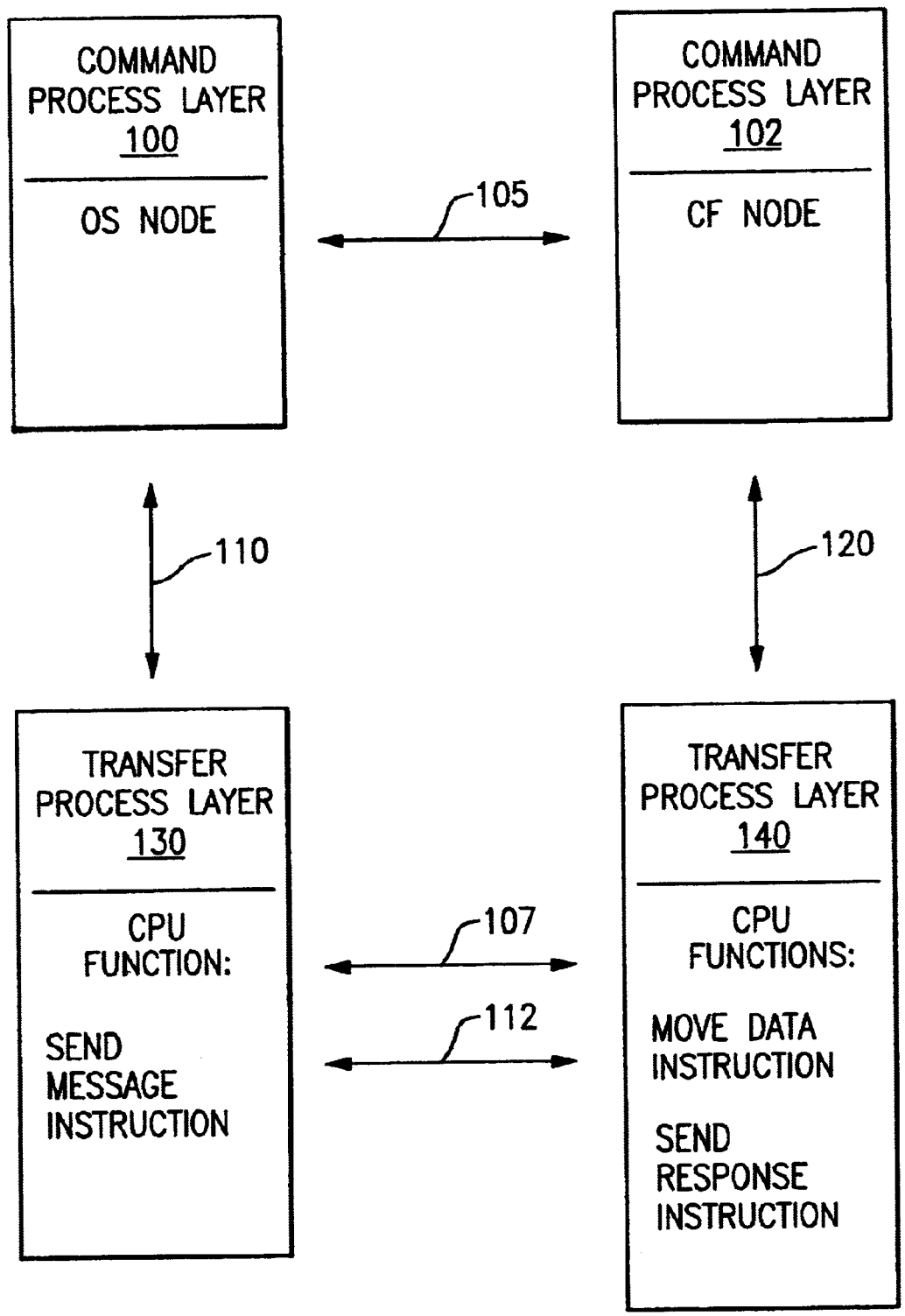
FIG. 1 is an illustration of the protocol layers that exist in a current parallel sysplex connection using link hardware as provided by one embodiment of the present invention.

FIG. 1 illustrates the function and protocol layers (100, 102, 130, and 140) that exist in a current parallel sysplex connection using link hardware. The arrows shown as 105 and 107 respectively, indicate a logical or functional relation between similar protocol layers. The arrows shown as 110 and 120 respectively, indicate the physical interfaces between different protocol layers, i.e. the actual signal path required in the current implementation to allow the similar protocol layers to communicate.

Figure 4:
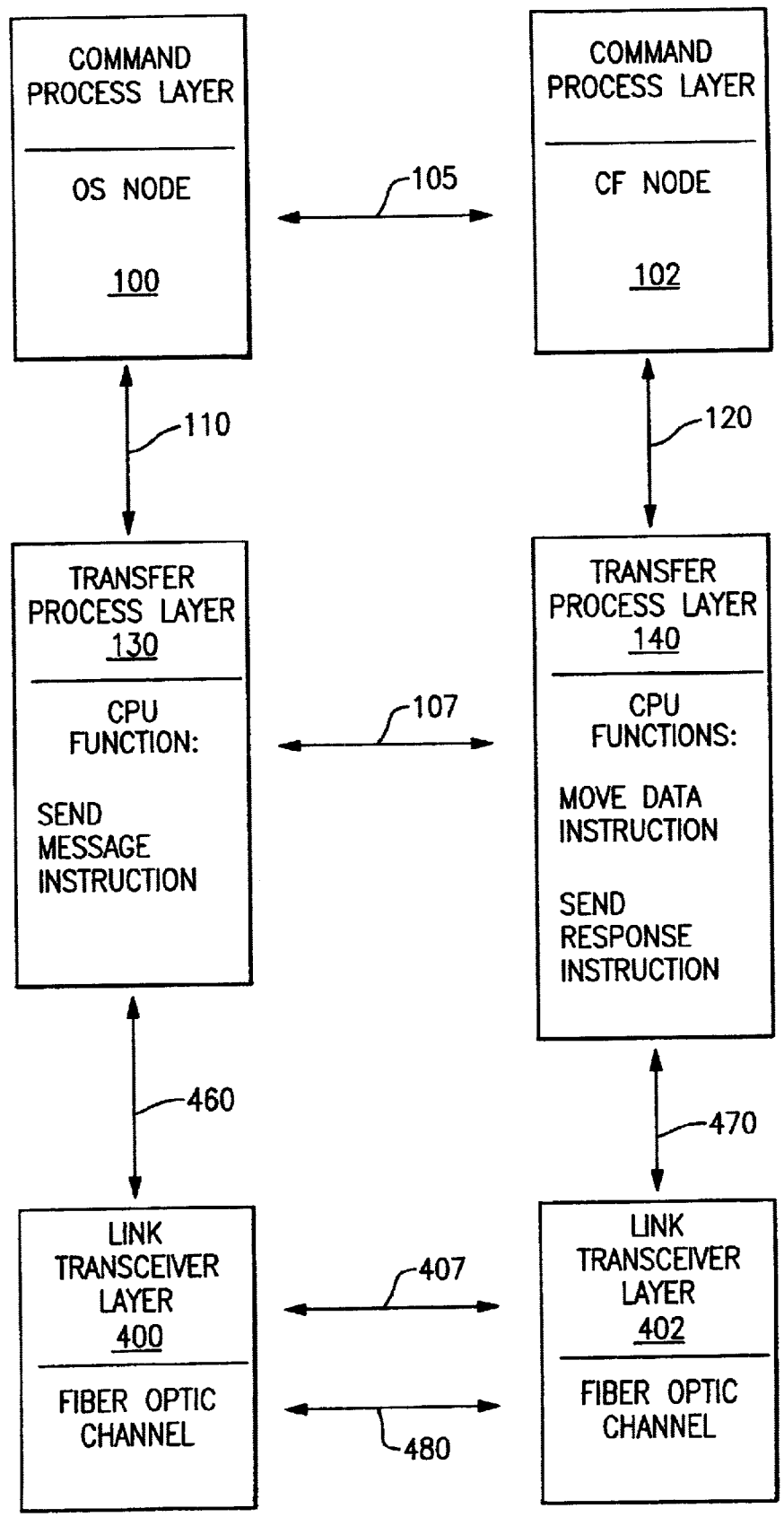
FIG. 4 is an illustration of the protocol layers that exist in a current parallel sysplex connection using link hardware.

The invention as illustrated in FIG. 1, replaces the Link Transceiver Layers as illustrated in FIG. 4 by adding a direct connection, shown at 112, between the Transfer Process Layers 130 and 140.

Figure 2:
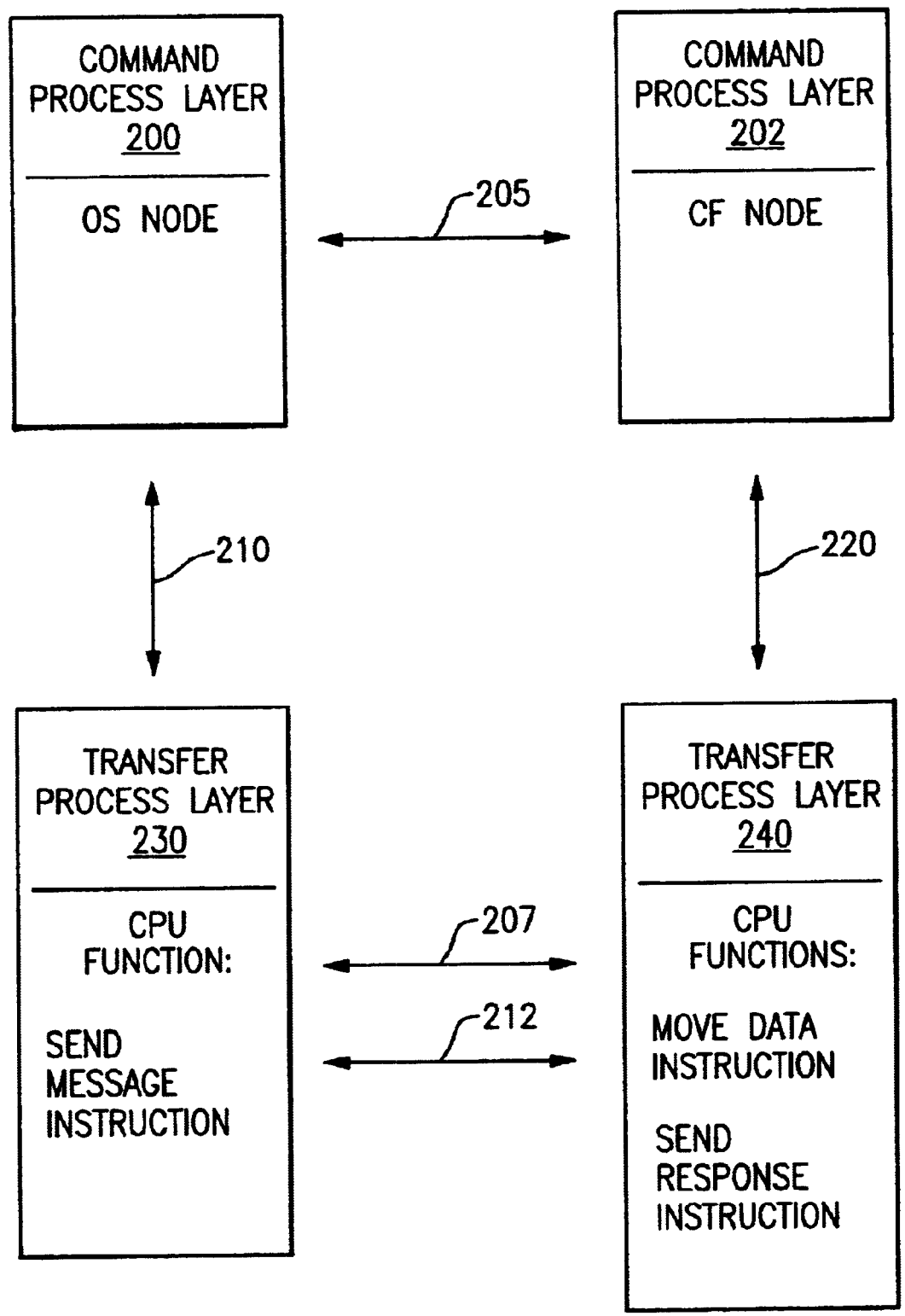
FIG. 2 depicts a parallel sysplex connection as used by one embodiment of the present invention.

FIG. 2 depicts a parallel sysplex connection using one embodiment of the present invention. One objective of this design is to replace the link transceiver layers and the interfaces between them by adding a physical interface between the transfer process layers 230 and 240. The logical interface between the transfer process layers is unaffected by the invention and remains unchanged.

To accomplish this task, the Send Message Instruction in the transfer process layer is invoked with a subchannel as a parameter. This subchannel describes the CF node target and a subset of possible links that can be used to communicate between the OS node and the CF node. The transfer process layer selects among available non-busy links to initiate the communication. Each link, whether a physical link or an emulated link, is associated with a link control block located in the hardware system area. Hardware links use the link control block to store link status and interface information that is needed to communicate with the link transceiver layer. In the invention, the emulated link uses the link control block for a different purpose. The emulated link does not need a protocol description for communicating with the link transceiver layer because this layer is eliminated when an emulated link is present. However, the emulated link needs to replace the physical interface between the OS node and CF node link transceiver layers in FIG. 1. The link control block of the emulated link provides this replacement in the invention.

Figure 3:
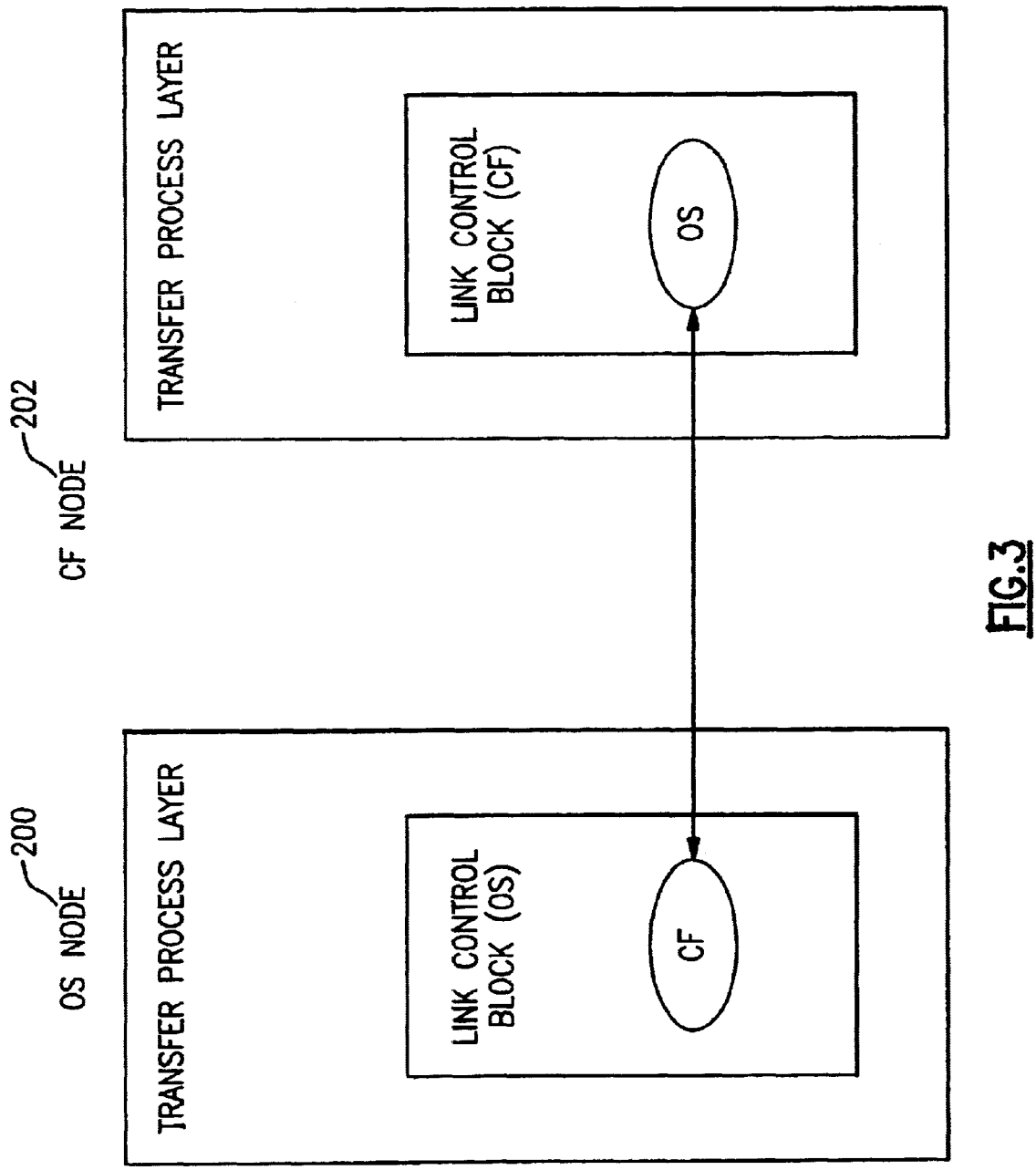
FIG. 3 is an illustration of a coupling system with links as per one embodiment of the present invention.

In FIG. 3, the coupling system definition for a CEC with emulated links generate link control blocks in fixed pairs where one link control block of the pair belongs to OS node transfer process layer and the other link control block of the pair belongs to the CF node transfer process layer.

Certain CPU code has the ability to move information between logical partitions by translating the addresses within a partition to a common host absolute e address format.

A link control block that is used to manage the link transceiver interface is given an additional function when it is used to describe one of the emulated links. For emulated links, the link control blocks must be defined in pairs, one for the OS node 200 and one for the CF node 202.

The present invention has the ability to take advantage of a number of existing elements in the current sysplex implementation and the I/O subsystem design. With the help of some modifications, the current implementation can be used. In an alternate embodiment some new elements have been added.

New Elements

Buffer Busy Indicators

A control block in the hardware system area includes an area to indicate that a new command has been placed in the CF partner link control for execution by the CF operating system. These Buffer Busy indicators are examined by the Locate Channel Buffer instruction and information on the location of the new command is returned to the CF operating system code.

Error State Pending Indicators

A control block in the hardware system area has an Error State Pending indicator for each Internal Channel in the system. The Error State Pending indicators are tested and manipulated by the Test Message Path State and Clear Message Path State instructions.

Message Responses

The response block of a primary message is stored directly to the OS partition by licensed internal code running in the CF partition. The exact location of the message response block (MRB) is determined from information located in the OS partner link control block. Completion status in the OS partner link control block is updated by licensed internal code running in the CF partition. Responses to operations that are completed asynchronously to the originating SMSG instruction are queued to an asynchronous message Processor and completion is indicated in the subchannel.

Data Mover (Scatter/Gather)

The data areas in the OS partition are addressed as link data buffer addresses by the SMSG instruction. However, the data areas in the CF partition are addressed according to different logical definitions. The internal channel data moving instruction in the CF partition moves data appropriately between these buffers which may have different numbers and lengths.

Secondary Command Handling

A processor or channel that receives the secondary message (i.e. at the OS partition side of the secondary command transfer) normally performs secondary commands that are sent from a CF partition to an OS partition. For internal channels, the secondary command is performed by the CF partition, which originates the secondary command. The command is interpreted as if it is already present at the OS partition channel. These secondary commands include cross invalidates, list notifications and fencing requests.

Use of Existing Elements

Subchannels

A S/390 subchannel is used to describe to Coupling Facility to the transport protocol layer.

Channel Path Ids

An Internal Channel is assigned a channel path ID in the range 0–255.

Path Selection Controls

The Internal Channel path is selected using the same controls as used to select the fiber optic channels.

Coupling Facility Link Buffer Operation Controls

The Internal Channel uses the same architected and internal facilities to represent the state of the channel as used by the fiber optic channels.

CPU Operand Access Control Registers/Zone Relocation

The Internal Channel uses the addressing and translation functions of the Operand Access Control Registers to effect the access of storage in multiple LPAR partitions (zones) by the licensed internal code that implements the Internal Channel function.

Modified Elements

Link Controls

The Link Control Block has several changes for the Internal Channel:

An indicator that this link is an Internal Channel

A pointer to the partner link control block at the other end of the emulated link.

LPAR partition (zone) addressing information for the current active operation.

Send Message Instruction

The modification of the Send Message Instruction includes:

A test to determine if the selected path is an Internal Channel.

Moving the Message Command Block (MCB) to the appropriate buffer control area in the Coupling Facility partition.

Formation of a list of addresses within the OS logical partition which identify either 1) the origin of data to be written to the Coupling Facility or 2) the location of data to be read from the Coupling Facility.

Setting the emulated busy bit associated with this Internal Channel buffer.

Locate Channel Buffer Instruction

The modification of the Locate Channel Buffer instruction includes:

Additional controls for searching and recording the emulated busy vectors.

Additional controls for selecting the Channel Operation Block.

Signal Channel Buffer Instruction

The modification of the Signal Channel Buffer instruction includes:

A test to determine if the selected path is an Internal Channel.

Calculation of the address of the MRB associated with the MCB launched from the OS partner link control block.

Storing the MRB to the zone address within the OS logical partition.

Setting completion indication in the partner OS link control block.

Setting the,control mechanisms necessary for completing the message asynchronously.

Move Channel Buffer Data Multiple Instruction

The modification of the Move Channel Buffer Data Multiple instruction includes:

A test to determine if the selected path is an Internal Channel.

A test to determine if data must be written to or read from the CF.

Translation of data area addresses in the OS partition and the CF partition necessary to move the data between the partitions.

Move the data and set an indication that the data move is complete.

Test Message Path State Instruction

The modification of the Test Message Path State instruction includes:

A test to determine if the selected path is an

Internal Channel Testing of the emulated Error State Pending indicators.

Clear Message Path State Instruction

The modification of the Clear Message Path State instruction includes:

A test to determine if the selected path is an Internal Channel Manipulation of the emulated Error State Pending indicators.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a computer network environment having a plurality of nodes, interface links and at least one central electronic complex divided into one or more physical and or virtual sub-environments, a method of affecting connectivity comprising the steps of:

providing a first control program and a second control program in said central electronic complex;

establishing a first command process layer and a first transfer process layer within said first control program, and a second command process layer and a second transfer process layer within said second control program;

linking said first command process layer to said first transfer process layer in said first control program;

linking said second command process layer to said second transfer layer in said second control program;

emulating an internal channel link between said first transfer process layer and said second transfer process layer; and providing a physical interface between said first transfer process layer and said second transfer process layer without affecting any logical interfaces between said transfer process layers.

2. The method of claim 1, wherein said transfer process layer is invoked by said first control program using a send message instruction.

3. The method of claim 2, wherein a subchannel is used as a parameter to describe said second control program as a target.

4. The method of claim 3, wherein a subset of possible links are provided in order to establish communication between said first and said second control programs.

5. The method of claim 4, wherein said first transfer process layer selects among available non-busy links to initiate the communication.

6. The method of claim 5, wherein each link, both physical and emulated, are associated with a link control block located in a hardware system area in the environment.

7. The method of claim 6, wherein the second control program provides link control blocks in fixed pairs each belonging to first and second transfer layers.

8. In a computer network environment having a plurality of nodes, interface links and at least one central electronic complex divided into one or more physical and or virtual sub-environments, an apparatus for providing connectivity comprising:

a first and a second control program provided in said central electronic complex;

a first and a second command process layer and a first and a second transfer process layer established within said first and second control programs respectively for handling data;

linking component for linking said first command process layer to said first transfer process layer in said first control program;

emulating means for providing an internal channel link between said first transfer process layer and said second transfer process layer; and a physical interface provided between said first transfer process layer and a second transfer process layer without affecting any logical interface(s) between said transfer process layers.

9. The method of claim 8, wherein said transfer process layer is invoked by said first control program using a send message instruction.

10. The method of claim 9, wherein a subchannel is used as a parameter to describe said second control program as a target.

11. The method of claim 10, wherein a subset of possible links are provided in order to establish communication between said first and said second control programs.

12. The method of claim 11, wherein said first transfer process layer selects among available non-busy links to initiate the communication.

13. The method of claim 12, wherein each link, both physical and emulated, are associated with a link control block located in a hardware system area in the environment.

14. The method of claim 13, wherein the second control program provides link control blocks in fixed pairs each belonging to first and second transfer layers.

15. In a computer network environment having a plurality of nodes, interface links and at least one central electronic complex divided into one or more physical and or virtual sub-environments, a method of affecting connectivity comprising the steps of:

providing an OS control program and a coupling facility in said central electronic complex;

establishing a command process layer and a transfer process layer each for said OS control program and said coupling facility;

linking said command process layers to said transfer process layers and emulating an internal channel link between said transfer process layers using a set of commands; and providing a physical interface between said transfer process layers without affecting any logical interfaces between said transfer process layers.

16. The method of claim 15, wherein one of said commands provides a control block area in a hardware system area to indicate that a new command has been placed in a coupling facility partner link control for execution by a coupling facility operating system.

17. The method of claim 16, wherein one of said commands is a Buffer Busy Indicator command.

18. The method of claim 17, wherein Buffer Busy indicators are examined by a Locate Channel Buffer instruction and information on location of a new command is returned to said coupling facility operating system code.

19. The method of claim 15, wherein one of said commands provides a control block in a hardware system area showing an error state pending indicator for each Internal Channel.

20. The method of claim 16, wherein one of said commands is a Error State Pending Indicator command.

21. The method of claim 17, wherein The Error State Pending indicators are tested and manipulated by a Test Message Path State and a Clear Message Path State instructions.

22. The method of claim 15, wherein one of said commands provides the storing of a primary message directly into an OS partition by internal code running in a coupling facility partition.

23. The method of claim 22, wherein one of said commands is a message response command.

24. The method of claim 23, wherein said message response command determines the exact location of a message response block (MRB) from information located in an OS partner link control block.

25. The method of claim 24, wherein completion status in said OS partner link control block is updated by internal code running in said coupling facility partition.

26. The method of claim 25, wherein responses to operations that are completed asynchronously to an originating SMSG instruction are queued to an asynchronous message Processor and completion is indicated in an associated subchannel.

27. The method of claim 15, wherein one of said commands provides data area addresses in an OS partition as link data buffer addresses by an SMSG instruction.

28. The method of claim 27, wherein said one command further provides data areas in a coupling facility partition addressed according to different logical definitions.

29. The method of claim 28, wherein an internal channel data moving instruction in said CF partition moves data appropriately between buffers which may have different numbers and lengths.

30. The method of claim 27, wherein said special command is a Data Mover (Scatter/Gather) command.

31. The method of claim 16, wherein one of said commands is a Secondary Command Handling command.

32. The method of claim 31, wherein one of said commands is a secondary message command which provides for the receipt by a processor or channel, a secondary message sent from a coupling facility partition to an OS partition.

33. The method of claim 32, wherein for internal channels, said secondary message command is performed by said coupling facility partition, which originates said secondary message command.

34. The method of claim 33 wherein said secondary message command is interpreted as if it was already present at an OS partition channel.

35. The method of claim 34, wherein said secondary command include at least a cross invalidate, a list notification and a fencing request.

36. In a computer network environment having a plurality of nodes, interface links and at least one central electronic complex divided into one or more physical and or virtual sub-environments, an apparatus for affecting connectivity comprising:

an OS control program and a coupling facility program provided in said central electronic complex;

a command process layer and a transfer process layer provided for each of said OS and said coupling facility;

linkage connecting said command process layers to said transfer process layers and an emulator providing an internal channel link between said transfer process layers using a set of commands; and a physical interface provided between said transfer process layers without affecting any logical interfaces between said transfer process layers.

* * * * *